United States Patent
Chaudhry et al.

(10) Patent No.: US 12,499,155 B2
(45) Date of Patent: Dec. 16, 2025

(54) SYSTEM AND METHOD FACILITATING A MULTI MODE BOT CAPABILITY IN A SINGLE EXPERIENCE

(71) Applicant: JIO PLATFORMS LIMITED, Ahmedabad (IN)

(72) Inventors: Arijay Chaudhry, Pune (IN); Ravindra Singh Chhabra, Bhopal (IN); Abhishek Farkade, Pune (IN); Gaurav Duggal, Hyderabad (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 291 days.

(21) Appl. No.: 18/028,551

(22) PCT Filed: Aug. 31, 2022

(86) PCT No.: PCT/IB2022/058152
§ 371 (c)(1),
(2) Date: Mar. 26, 2023

(87) PCT Pub. No.: WO2023/031811
PCT Pub. Date: Mar. 9, 2023

(65) Prior Publication Data
US 2023/0359670 A1    Nov. 9, 2023

(30) Foreign Application Priority Data
Aug. 31, 2021 (IN) .............................. 202121039490

(51) Int. Cl.
*G06F 40/30* (2020.01)
*G06F 16/9032* (2019.01)

(52) U.S. Cl.
CPC ........ *G06F 16/90332* (2019.01); *G06F 40/30* (2020.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS 10,178,218 B1 * 1/2019 Vadodaria ............... G06F 40/35
10,891,947 B1 * 1/2021 Le Chevalier .......... G06F 3/167
(Continued)

OTHER PUBLICATIONS

Radisys Engage, "Unique 3-in-1 Video Bot", https://www.radisys.com/engage/engagevideo-assistant, Mar. 12, 2020, Total pp. 07.
(Continued)

*Primary Examiner* — Lamont M Spooner
(74) *Attorney, Agent, or Firm* — Raj S. Dave; Dave Law Group LLC

(57) ABSTRACT

The present invention provides a robust and effective solution to an entity or an organization by enabling them to implement a system for automatic switching between visual responses, audio responses and textual responses in an omni-channel single view experience. Particularly, the system and method may empower a user to choose between any mode of interaction, the modes being provision of a visual interaction, audio interaction or a textual based interaction and a combination thereof based on a machine learning architecture and also provide seamless human agent handover. Thus, the system and method of the present disclosure may be beneficial for both entities and users.

19 Claims, 20 Drawing Sheets

(56) References Cited

U.S. PATENT DOCUMENTS

| | | | |
|---|---|---|---|
| 10,977,258 B1* | 4/2021 | Liu | G06F 16/2365 |
| 11,043,208 B1* | 6/2021 | Michelin | G06N 20/20 |
| 11,099,867 B2* | 8/2021 | Brown | G06F 3/0488 |
| 11,550,831 B1* | 1/2023 | Marks | G06N 20/00 |
| 2013/0272511 A1* | 10/2013 | Bouzid | G06F 8/38 379/88.01 |
| 2014/0372908 A1* | 12/2014 | Kashi | H04L 65/1089 715/753 |
| 2015/0339348 A1* | 11/2015 | Joo | G06F 16/433 707/722 |
| 2016/0103830 A1* | 4/2016 | Cheong | G06F 16/745 715/738 |
| 2016/0239568 A1* | 8/2016 | Packer | G06F 16/951 |
| 2017/0187868 A1* | 6/2017 | Katai | G06F 3/04817 |
| 2018/0007204 A1* | 1/2018 | Klein | H04L 67/14 |
| 2018/0007205 A1* | 1/2018 | Klein | G10L 15/26 |
| 2018/0054691 A1* | 2/2018 | Sharifi | H04M 1/72448 |
| 2018/0157747 A1* | 6/2018 | Tiwary | G06F 16/951 |
| 2018/0174020 A1* | 6/2018 | Wu | G06N 3/044 |
| 2018/0218252 A1* | 8/2018 | Wu | G06Q 50/00 |
| 2019/0012373 A1* | 1/2019 | Malik | H04L 67/565 |
| 2019/0066136 A1* | 2/2019 | Kopikare | G06N 5/046 |
| 2019/0095775 A1* | 3/2019 | Lembersky | G06N 3/006 |
| 2019/0294668 A1* | 9/2019 | Goel | H04N 21/4788 |
| 2019/0354252 A1* | 11/2019 | Badr | G06F 3/0484 |
| 2020/0050940 A1* | 2/2020 | Li | G06N 3/044 |
| 2020/0097764 A1* | 3/2020 | de Juan | G06F 16/532 |
| 2020/0152197 A1* | 5/2020 | Penilla | H04L 67/125 |
| 2020/0204848 A1* | 6/2020 | Johnson | H04W 4/90 |
| 2020/0236068 A1* | 7/2020 | TeNyenhuis | G06F 40/35 |
| 2020/0257853 A1* | 8/2020 | Hussain | G06F 40/216 |
| 2020/0372063 A1 | 11/2020 | Sekar et al. | |
| 2021/0104241 A1* | 4/2021 | Doggett | G10L 15/24 |
| 2021/0134270 A1* | 5/2021 | Rakshit | G06F 3/167 |
| 2021/0158811 A1* | 5/2021 | Di Fabbrizio | G10L 13/00 |
| 2021/0174015 A1* | 6/2021 | Bhattacharya | G06N 3/044 |
| 2021/0248376 A1* | 8/2021 | Zhao | G06V 20/49 |
| 2021/0358188 A1* | 11/2021 | Lebaredian | G06F 40/30 |
| 2022/0084513 A1* | 3/2022 | Sgobba | G10L 15/063 |
| 2022/0200936 A1* | 6/2022 | Higgins | H04L 51/02 |
| 2022/0270505 A1* | 8/2022 | Carmichael | G09B 7/02 |
| 2023/0027628 A1* | 1/2023 | Wu | G06F 16/9038 |
| 2023/0334743 A1* | 10/2023 | Baszucki | G06T 13/205 |
| 2024/0169199 A1* | 5/2024 | Kim | G06N 3/08 |
| 2024/0311404 A1* | 9/2024 | Hurwitz | G06F 16/3329 |
| 2024/0321267 A1* | 9/2024 | Voigt | H04L 51/02 |
| 2024/0364770 A1* | 10/2024 | Shaffer | H04L 65/403 |
| 2024/0386015 A1* | 11/2024 | Crabtree | G06F 16/9024 |
| 2025/0077583 A1* | 3/2025 | Wu | G06F 16/90332 |

OTHER PUBLICATIONS

International Search Report, PCT/IB2022/058152, Nov. 15, 2022, Total pp. 03.

\* cited by examiner

SYSTEM AND METHOD FACILITATING A MULTI MODE BOT CAPABILITY IN A SINGLE EXPERIENCE

CROSS-REFERENCE TO RELATED APPLICATION(S)

This application is a National Stage of International Application No. PCT/IB2022/058152, filed on Aug. 31, 2022, which claims priority to Indian Patent Application No. 202121039490, filed Aug. 31, 2021, the disclosures of which are hereby incorporated by reference in their entirety.

FIELD OF INVENTION

The embodiments of the present disclosure generally relate to facilitating generation of response to a user query. More particularly, the present disclosure relates to a system and method for facilitating conversion of one or more automated textual, audio or visual responses to a user query to one another based on a machine learning based architecture.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Processing of the computing devices is hugely improved over the years such that the consumers have now one or more options to select from multiple features such as voice calling, messaging, video calling and many other value-added services initiated from native dialer applications. One of said multiple features in the smartphone device that has evolved is voice/video or any combination of multimedia call. The device has a user interface which typically includes a display with or without keypad including a set of alpha-numeric (ITU-T type) keys that may be real keys or virtual keys. Existing Bots are enabled with Text BOTs and customers are accustomed to interact with BOT using text Message for both queries as well as response. Currently, Customer Care Text BOTs are prevalent and these BOTs appear in a Website or an App. However, adoption of such BOTs is not high as customer needs an access/active use of Website or App. For customers, natural way to get queries answered is by asking questions verbally.

A customer survey showed that customers prefer to ask questions verbally and get an answer in a visual mode, especially in the safety of privacy. Customers with the existing bots do not have the power of interacting verbally and getting response in the form of a video or audio in a single experience. The customer always has to cut the call if he/she needs to change mode of interaction. Re-connecting to the bot is not only frustrating but a tedious process too. Also, if customer experiences poor network, video streaming has a poor experience and there is no technology to audio or a textual based interaction in the existing bots. Further, existing bots are not enabled with automatic selection of lower-bandwidth interaction or choose a mode of BOT interaction. There is no personalized preference for customer Interaction and no network strength-based smooth customer interaction in the existing bots. There is no Zero-Wait customer service, no cost-effective solution with a need to contact a human agent only for highly complex problems, no support at all customer interface touch points i.e 3 Modes—Video, Voice, Text and no Quick Bot Creation and intent addition support.

There is therefore a need in the art to provide a system and a method that can facilitate self-generation of entity/user specific bots that can be customized with one or more entity-specific automated visual responses to user queries that can be switched back and forth to audio or textual form of interaction based on user preference or based on network connection in a single experience.

OBJECTS OF THE PRESENT DISCLOSURE

Some of the objects of the present disclosure, which at least one embodiment herein satisfies are as listed herein below.

It is an object of the present disclosure to enable a 3-in-one Chat, Audio and Video service integration to provide seamless customer experience.

It is an object of the present disclosure to modernise Call Centre IVR Experience from current Voice IVR to Zero-Wait Video/Voice Bot with seamless human agent handover capabilities.

It is an object of the present disclosure to create truly Omni-Channel single view customer care service by Unifying Text Bots, Voice Bots and Video Bots into one single 3 in 1 Bot instance via OTT and Telephony channel.

It is an object of the present disclosure to facilitate flexibility to the user to seamlessly toggle between either of the three modes as per the convenience and comfort of the user.

It is an object of the present disclosure to provide for an integrated bot (Voice BOT as well as Video BOT) with an interactive voice response (IVR) so that user can ask questions verbally and get an answer in the Video or Voice Mode from the integrated bot.

It is an object of the present disclosure to facilitate a bot integrated with Telephony IVR System, over Native Dialer and OTT BOTs with Chat—Audio and Video Bot capability.

It is an object of the present disclosure for quick creation and publishing of Bot on channel of choice such as Native Dialer, IVR, VOIP, Mobile App, Portal, social media that enables consistent quality of Customer Care.

It is an object of the present disclosure for publishing a Bot and democratizing access to state-of-the-art customer care solution support for transfer to human agents for complex queries.

It is an object of the present disclosure that facilitates third Party BOT Integration.

It is an object of the present disclosure that facilitates multilingual capabilities.

It is an object of the present disclosure to facilitate secure access to personalized information such as authentication via Face and Voice Recognition.

It is an object of the present disclosure to facilitate advanced analytics/dashboard.

It is an object of the present disclosure that offer EVA capabilities through Authoring Portal and 3-in-1 Bot Maker App.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure provides for a system for switching between a plurality of modes in a multi-bot interface. The system may include a processor that executes a set of executable instructions that are stored in a memory, upon execution of which, the processor may cause the system to receive, by a bot maker engine, a first set of data packets corresponding to a user query of a user. In an embodiment, the bot maker engine may be associated with the processor. The processor may further cause the system to receive by the bot maker engine, a knowledgebase comprising a set of expressions associated with one or more potential intents corresponding to the user query from a database coupled to a centralized server. In an embodiment, the centralized server may be operatively coupled to the processor. The processor may further cause the system to extract, by the bot maker engine, a set of attributes corresponding to a form of the user query selected from any or a combination of a textual form, an audio form, and a video form and then generate, by a Machine learning (ML) engine, one or more responses based on the extracted set of attributes. In an embodiment, the ML engine may be associated with the processor. Furthermore, the processor may cause the system to switch, by the ML engine, the user query between the plurality of modes based on the user and the system requirement in the multi-bot interface, the plurality of modes corresponding to any or a combination of the textual form, the audio form, and the video form in the multi-bot interface.

In an embodiment, the processor may be further configured to convert, by the ML engine, the one or more responses to any or a combination of a textual form, an audio form, and a video form based on the user and the system requirement in the multi-bot interface.

In an embodiment, the multi-bot interface may be a single omni-channel interface.

In an embodiment, the database coupled to the centralised server may be configured to store a plurality of users, a plurality of bots, a plurality of user queries, a plurality of video forms, a plurality of audio forms and a plurality of textual messages associated with a predefined topic with a time stamp.

In an embodiment, the processor may be further configured to extract, by the bot maker engine, a second set of data packets from the centralized server to initialize the multi-bot interface, the second set of data packets pertaining to information that may include the one or more potential intents, one or more video forms, and a set of trending queries.

In an embodiment, a user may be identified, verified and then authorized to access the system.

In an embodiment, processor may be further configured to initiate, the one or more responses once an authorized user generates a user query. In an embodiment, the one or more responses may correspond to the user query that may be mapped with the one or more potential intents.

In an embodiment, the processor may be further configured to enable the user, by the ML engine to switch the user query to any of the textual, the audio form and the video form from a current form to initiate the user query in the multi-bot interface.

In an embodiment, the processor may be further configured to enable the user, by the ML engine to switch the response to the user query to any of the textual, the audio form and the video form from a current form of the response provided by the system in the multi-bot interface.

In an embodiment, the multi-bot interface may be represented in the form of any or a combination of an animated character, a personality character, or an actual representation of an entity character.

In an embodiment, the one or more responses pertaining to the audio form and the video form may be manually recorded using a recording device.

In an embodiment, the processor may be further configured to pre-process by the ML engine, the knowledgebase through a prediction engine for any or a combination of data cleansing, data correction, synonym formation, proper noun extraction, white space removal, stemming of words, punctuation removal, feature extraction, and special character removal.

In an embodiment, the processor may be further configured to generate the one or more responses and record respective potential video frame, audio or textual responses for a set of user queries.

In an aspect, the present disclosure provides for a method for switching between a plurality of modes in a multi-bot interface. The method may include the steps of receiving, by a bot maker engine associated with a processor operatively coupled to the system, a first set of data packets corresponding to a user query of a user, and receiving, by the bot maker engine, a knowledgebase comprising a set of expressions associated with one or more potential intents corresponding to the user query from a database coupled to a centralized server operatively coupled to the processor. The method may further include the step of extracting, by the bot maker engine, a set of attributes corresponding to a form of the user query, wherein the form of the user query is selected from any or a combination of a textual form, an audio form, and a video form. Furthermore, the method may include the step of generating, by a Machine learning (ML) engine associated with the processor, one or more responses based on the extracted set of attributes, and then the step of switching, by the ML engine, the user query between the plurality of modes based on the user and the system requirement in the multi-bot interface, the plurality of modes corresponding to any or a combination of the textual form, the audio form, and the video form in the multi-bot interface.

Thus, the present disclosure provides a system and method to meet the objectives such as enabling a 3-in-one Chat, Audio and Video service integration to provide seamless customer experience, modernising call centre interactive voice response (IVR) experience from current Voice IVR to Zero-Wait Video/Voice Bot with seamless human agent handover capabilities as the switching between the plurality of modes takes negligible time. The fast switching also helps in facilitating flexibility to the user to seamlessly toggle between either of the 3 modes as per the convenience and comfort of the user and facilitates the user to ask questions verbally and the get an answer in the Video or Voice Mode. The multi-bot interface is a single interface thus providing a truly Omni-Channel single view customer care service by Unifying Text Bots, Voice Bots and Video Bots into one single 3 in 1 Bot instance via OTT and Telephony channel as the bot has integrated Telephony IVR System, over Native Dialer and OTT BOTs with Chat—Audio and Video Bot capability thus providing a quick creation and publishing of Bot on a channel of choice such as Native Dialer, IVR, VOIP, Mobile App, Portal, Social Media that enables consistent quality of Customer Care. The publishing of the Bot also leads to democratizing access to state-of-the-art customer care solution support for transfer to Agents for complex queries. It is an object of the present disclosure that facilitates third Party BOT Integration. The present disclosure also provides a bot that can converse in multiple languages thus facilitating multilingual capabilities. The authorization and validation process of the system further aids in facilitating secure access to personalized information such as authentication via Face and Voice Recognition. The system and method can further facilitate advanced analytics/dashboard. And offer EVA capabilities through Authoring Portal and the bot maker engine.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIGS. 3A-3G illustrate representations of the exemplary working of the system and method, in accordance with embodiments of the present disclosure.

FIG. 5A-5K illustrate representations for exemplary call flow scenarios and its implementation, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The present invention provides a robust and effective solution to an entity or an organization by enabling them to implement a system for automatic switching between visual responses, audio responses and textual responses in an omni-channel single view experience. Particularly, the system and method may empower a user to choose between any mode of interaction, the modes being provision of a visual interaction, audio interaction or a textual based interaction and a combination thereof based on a machine learning architecture and also provide seamless human agent handover. The explanation of obtaining a visual response to a user query by a bot is described in patent no 201821015878 entitled System and Method of Virtual Multimedia Contact Bot. Thus, the system and method of the present disclosure may be beneficial for both entities and users.

Figure 1:
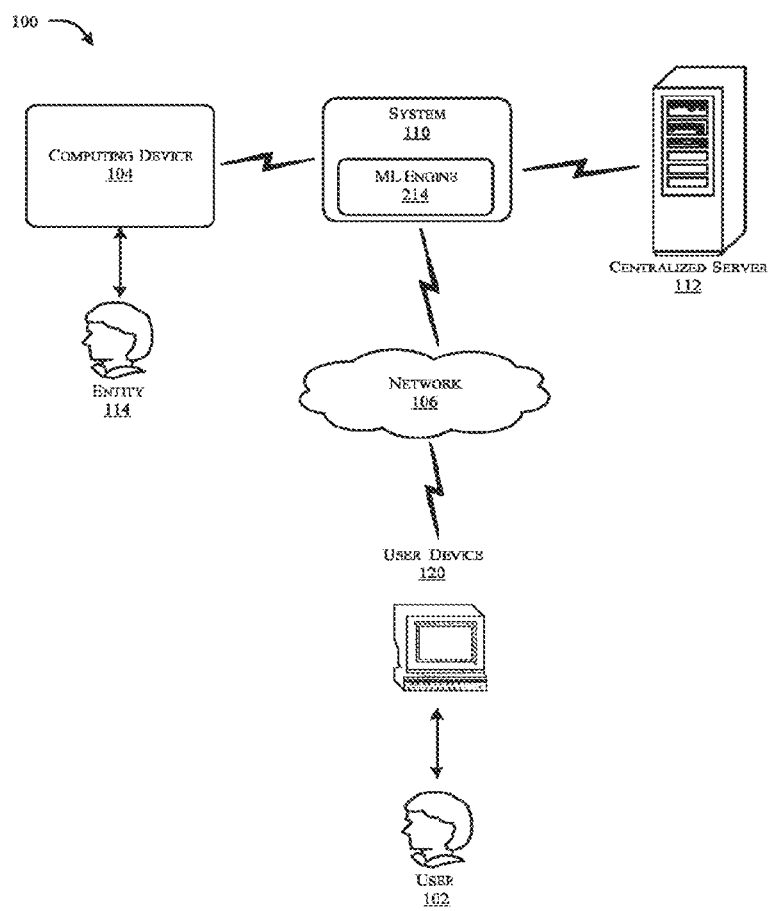
FIG. 1 illustrates an exemplary network architecture in which or with which the system of the present disclosure can be implemented for an executable multi-bot interface, in accordance with an embodiment of the present disclosure.

Referring to FIG. 1 that illustrates an exemplary network architecture (100) in which or with which system (110) of the present disclosure can be implemented, in accordance with an embodiment of the present disclosure. As illustrated in FIG. 1, by way of example and not by not limitation, the exemplary architecture (100) may include a user (102) associated with a user computing device (120) (also referred to as user device (120)), at least a network 106, at least a centralized server 112 and at least a second computing device (104) associated with an entity (114). More specifically, the exemplary architecture (100) includes a system (110) equipped with a machine learning (ML) engine (216) for facilitating managing user query through at least three modes of interactions on the bot from the user computing device (120).

The system (110) may include a database (210) that may store a knowledgebase having a set of responses to a set of user queries associated with the entity (114) and a plurality of information services associated with the user (102) and the query generated by the user.

As a way of example and not by way of limitation, the computing device (104) may be operatively coupled to the centralised server (112) through the network (106) and may be associated with the entity (114) configured to generate the set of responses and record respective potential video frame, audio or textual responses for the set of user queries. The system may include a bot maker engine (212) (refer to FIG. 2) that can receive a first set of data packets corresponding to a user query of a user, and also receive, from a database coupled to a server, a knowledgebase comprising a set of expressions associated with one or more potential intents corresponding to the user queries. The bot maker engine (212) may also extract a set of attributes corresponding to a form of the user query, wherein the form of the user query may be selected from any or a combination of a textual form, an audio form, and a video form. A machine learning (ML) engine (214) may be configured to switch between any of a textual form, an audio form, and a video form in an omni-connection interface. The ML engine (214) further may convert the one or more responses to any or a combination of textual form, audio form, and video form from any or a combination of textual form, the audio form, and the video form based on any user and system requirement in the single omni-channel interface.

In an embodiment, the database coupled to the centralised server (112) (also referred to as the server (112)) may be configured to store the users, bots, user queries, video forms, audio forms and textual messages associated with predefined topic with a time stamp.

In an embodiment, the bot maker engine (212) may extract from the centralized server (112) a second set of data packets to initialize the multi-faceted bot, the second set of data packets pertaining to information that may include the one or more potential intents, one or more video forms, and a set of trending queries.

In an embodiment, a user may be identified, verified and then authorized to access the system (110). In an embodiment, the one or more responses may be initiated once an authorized user generates the user query, and the one or more responses corresponding to the user query that may be mapped with the one or more potential intents that may be transmitted in real-time in the form of a third set of data packets to the user computing device (120) from server side of the multi-faceted bot.

In an embodiment, the ML engine (214) may be configured to enable the user to switch to any the textual, the audio form and the video form from a current form to initiate the user query in the single channel interface.

In an embodiment, the ML engine (214) is configured to enable the user to switch to any the textual, the audio form and the video form from a current form of response provided by the system in the single channel interface.

In an embodiment, the client side of the multi bot interface may be represented in the form of any or a combination of an animated character, a personality character, or an actual representation of the entity character.

In an embodiment, the responses pertaining to the audio form and the video form are manually recorded using a recording device, and where the responses pertaining to the textual form, the audio form and the video form may be stored in the database coupled to the server (112).

In an embodiment, the ML engine (214) may pre-process the knowledgebase through a prediction engine for any or a combination of data cleansing, data correction, synonym formation, proper noun extraction, white space removal, stemming of words, punctuation removal, feature extraction, and special character removal, where the data may pertain to the set of potential queries associated with the entity and corresponding any or a combination of textual form, audio form and video form responses.

The system (110) will further provide a seamless integration with existing call centre and interactive voice response (IVR) partner solutions. The audio bot will be able to upgrade from voice to video and vice versa. Whereas over the top (OTT) bot can be toggled between Video, Voice and Text thereby allowing real time bot switching.

In an embodiment, the system (110) may further provide autodetection of user equipment capability to service video or voice experience in an audio bot deployment.

In an embodiment, the computing device (104) and/or the user device (120) may communicate with the system (110) via a set of executable instructions residing on any operating system, including but not limited to, Android™, iOS™, Kai OS™ and the like. In an embodiment, computing device (104) and/or the user device (120) may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen and the like. It may be appreciated that the computing device (104) and/or the user device (120) may not be restricted to the mentioned devices and various other devices may be used. A smart computing device may be one of the appropriate systems for storing data and other private/sensitive information. The user device (120) may be communicably coupled to the centralized server (112) through the network (106) to facilitate communication therewith.

In an exemplary embodiment, a network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fiber optic network, some combination thereof.

In another exemplary embodiment, the centralized server (112) may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

Figure 2:
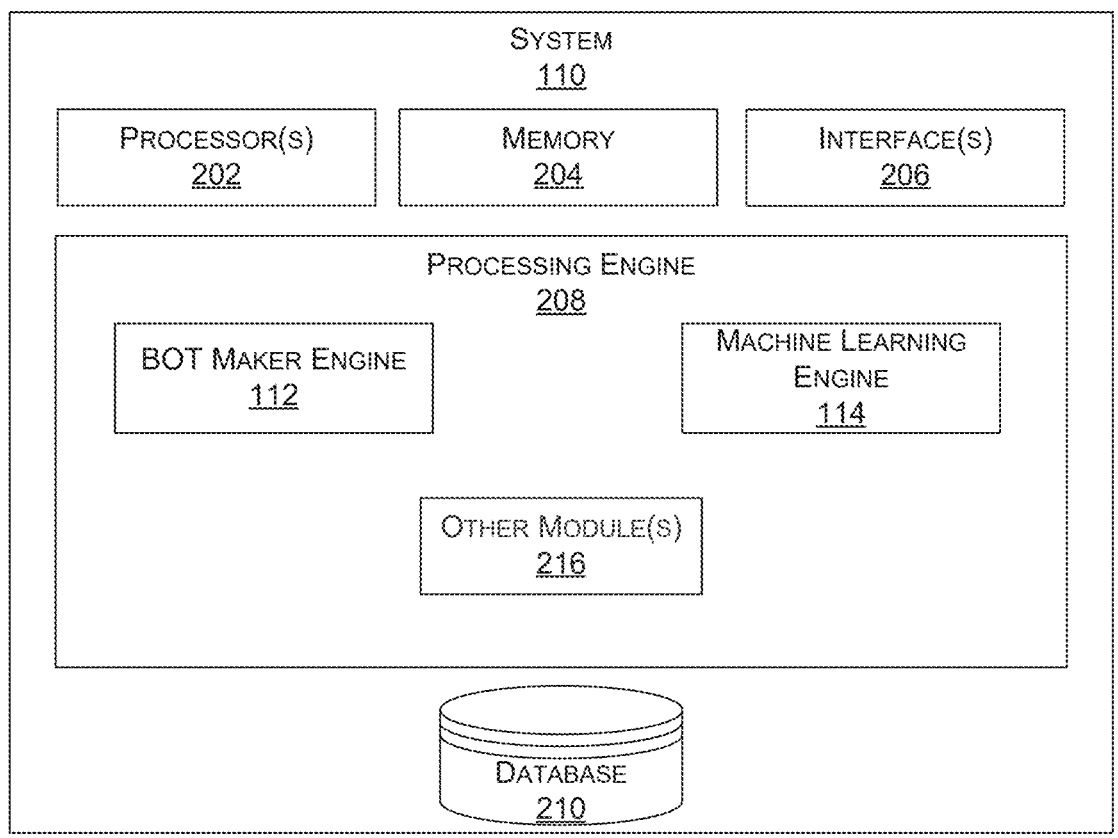
FIG. 2 illustrates an exemplary representation of system for an executable multi-bot interface, in accordance with an embodiment of the present disclosure.

In an embodiment, the system (110) may include one or more processors coupled with a memory, wherein the memory may store instructions which when executed by the one or more processors may cause the system to generate a multi-bot interface to provide responses to a user query in any visual form, audio form or textual form or in a combination thereof. FIG. 2 with reference to FIG. 1, illustrates an exemplary representation of system (110) for facilitating self-generation of an entity-specific bot through which one or more automated visual, audio, textual based responses and a combination thereof to an end-user query may be transmitted based on a machine learning based architecture, in accordance with an embodiment of the present disclosure. In an aspect, the system (110) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (110) may include an interface(s) 206. The interface(s) 204 may comprise a variety of interfaces, for example, interfaces for data input and output devices, referred to as I/O devices, storage devices, and the like. The interface(s) 204 may facilitate communication of the system (110). The interface(s) 204 may also provide a communication pathway for one or more components of the system (110). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may comprise the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry.

The processing engine (208) may include one or more engines selected from any of a bot maker engine (212), a machine learning (ML) engine (214), and other engines (216). The other engine(s) (216) may include a prediction engine, language processing engines, distributed event streaming platform such as a Kafka module and the like.

In an embodiment, the bot maker engine (212) of the system (110) can receive a first set of data packets corresponding to a user query of the user, and receive, from a database (210) coupled to a server (112), a knowledgebase that may include a set of expressions associated with one or more potential intents corresponding to the user queries. The bot maker engine (212) may also extract a set of attributes corresponding to form of the user query, wherein the form of the user query may be selected from any or a combination of a textual form, an audio form, and a video form. The bot maker engine (212) may extract from the server a second set of data packets to initialize the multi-faceted bot, where the second set of data packets may pertain to information that may include the one or more potential intents, one or more video forms, one or more audio forms and a set of trending queries.

An ML engine (214) may process training data that may include the user query, one or more responses corresponding to the user query, and the one or more potential intents that may be mapped to each of the user queries. The ML engine (214) may further predict by using the prediction engine one or more responses in any or a combination of the textual form, the audio form, and the video form based on the extracted set of attributes and the generated trained model and convert, using the ML engine (214), the one or more responses to any or a combination of textual form, audio form, and video form from any or a combination of textual form, the audio form, and the video form based on any user and system requirement in a single channel interface without disconnecting the communication made.

The ML engine (214) may be configured to enable the user to switch to any the textual, the audio form and the video form from a current form to initiate the user query. The ML engine may be further configured to enable the user to switch to any the textual, the audio form and the video form from a current form of response provided by the system.

In yet another aspect, the ML engine (214) can be configured to pre-processes the knowledgebase for any or a combination of data cleansing, data correction, synonym formation, proper noun extraction, white space removal, stemming of words, punctuation removal, feature extraction, and special character removal, wherein the data pertains to the set of potential queries associated with the entity and corresponding video frame responses.

In an embodiment, one or more processing engines may receive the user query in any language and provide the response corresponding to the user query in any language.

The ML engine may be configured to manage any or a combination of information associated with the users, a plurality of trained models, life cycle of each trained model of the plurality of trained models, sorting and searching the plurality of trained models, life cycle of a plurality of multi-faceted bots and generating executable instructions to invoke the multi-faceted bot among the plurality of multi-faceted bots. The database (210) coupled to the server may be configured to store the users, bots, user queries, video forms, audio forms and textual messages associated with predefined topic with a time stamp.

Figure 3A:
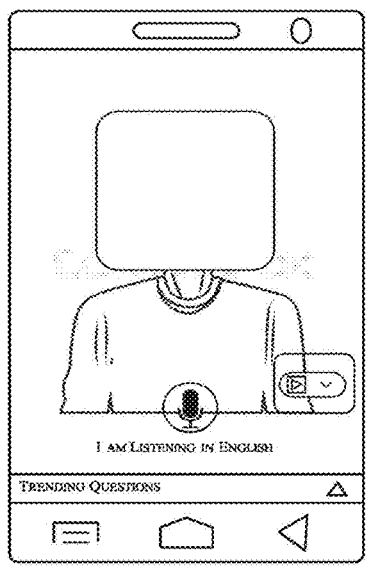
Figure 3B:
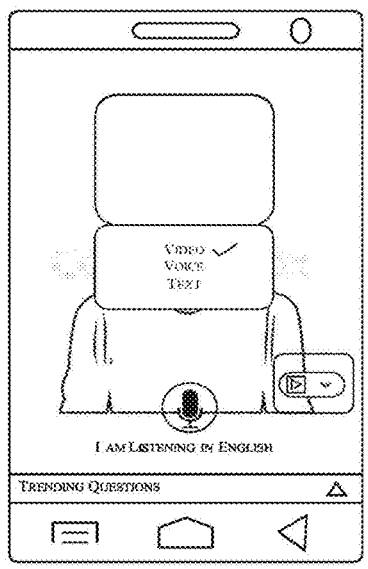
Figure 3C:
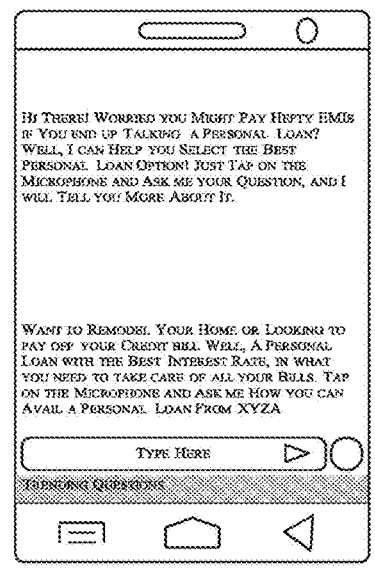
Figure 3D:
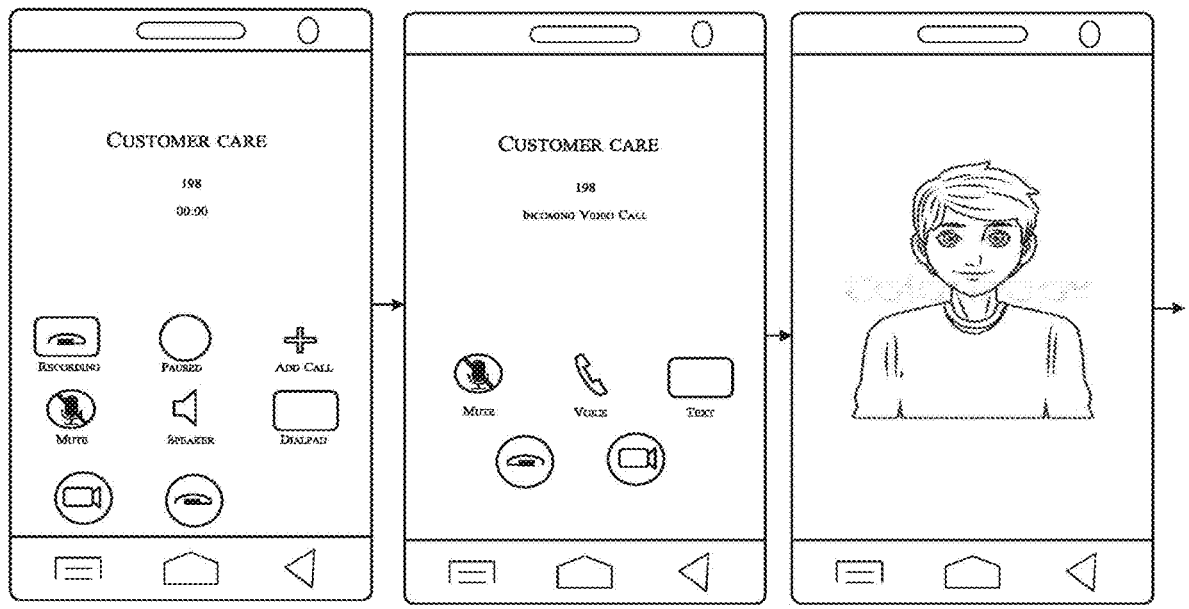
Figure 3B:
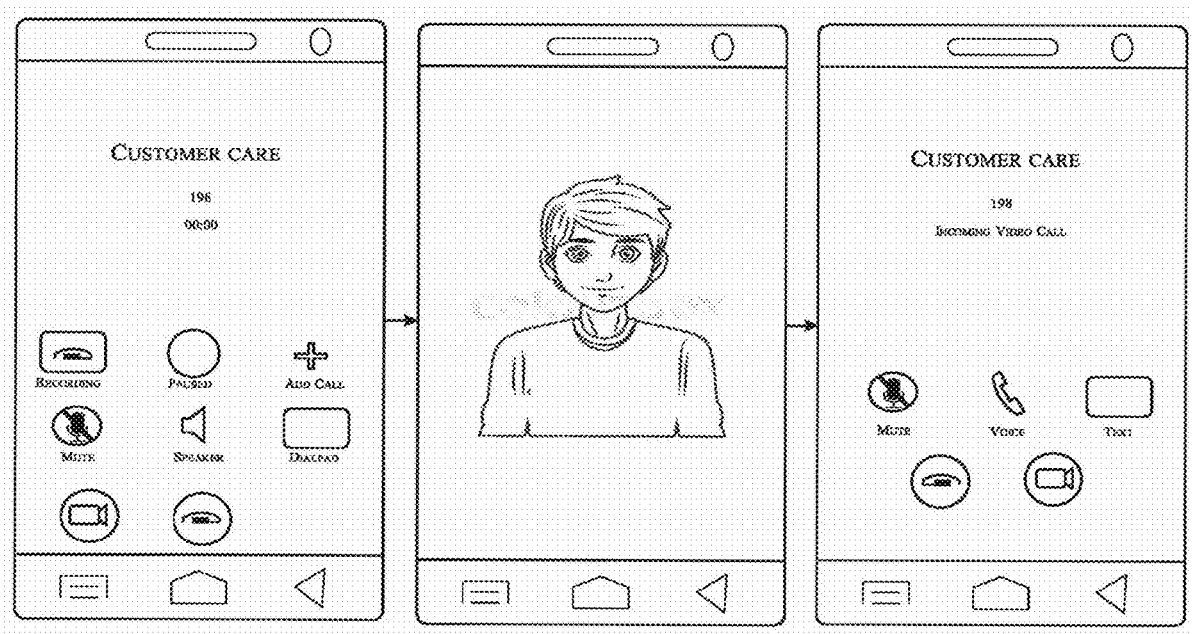

FIGS. 3A-3G illustrate representations of the exemplary working of the system (110) and method (300), in accordance with embodiments of the present disclosure. As illustrated by way of examples and not as limitations, the FIGS. 3A-3G illustrate the numerous ways in which the customer will be able to interact within the environment. The figures illustrate exemplary scenarios and call flows for interaction possibility between a first user or the customer, a Bot and a second user (the agent). FIG. 3A depicts exemplary implementations how a required mode can be chosen in the bot in a single experience while FIG. 3B illustrates seamless toggling between a textual, audio and video services. FIG. 3C illustrates an exemplary textual or chat mode of the bot. FIG. 3D illustrates an exemplary bot interface wherein the first user can: select any language, press a first predefined number to IVR, press a second predefined number for video assistance, press a third predefined number for voice assistance, illustrates an exemplary instance wherein a customer sends a video request and the IVR sends a Video upgrade request which is accepted by the customer. The FIG. 3D further illustrates the Bot interacting with the customer Bot ends call OR the Customer wants to speak to agent.

FIG. 3E illustrates downgrading of video call to Voice and seamlessly handed over to agent with relevant skill code and an outbound video/voice call to customer. The customer accepts video call and gets connected to video assistant or customer accepts voice call and gets connected to voice assistant, and the bot interacts with the customer. The call ends or call is connected to agent providing seamless agent handoff.

Figure 3F:
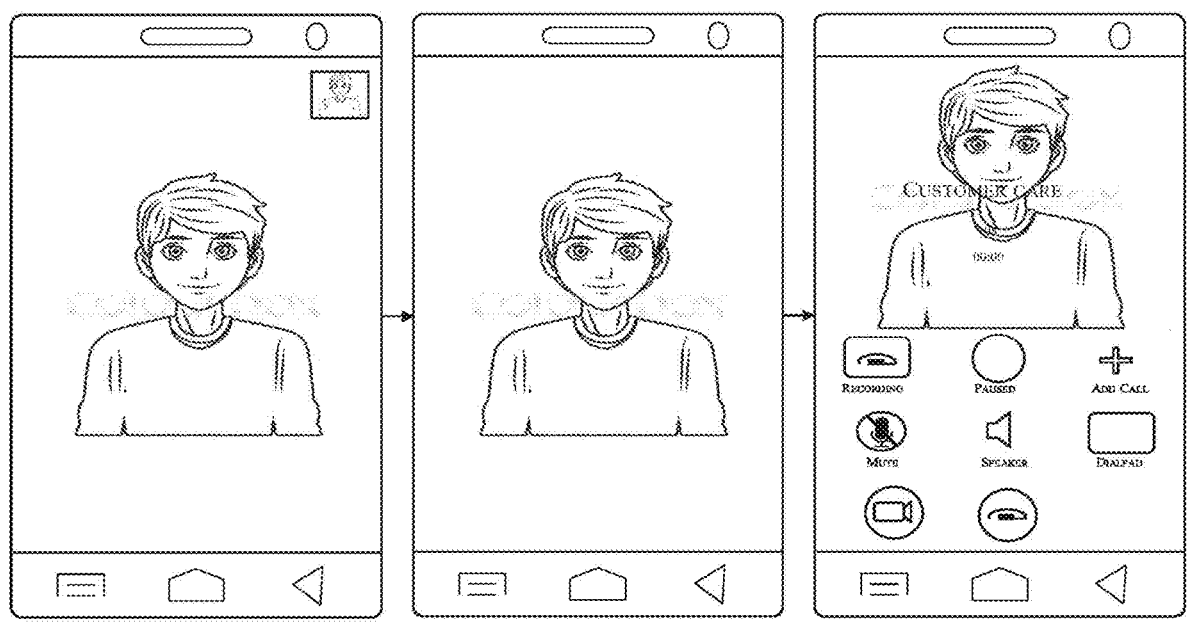

FIG. 3F further illustrates that on dialling a predefined number of the entity, the bot may ask the customer to select any language, press a first predefined number to IVR, press a second predefined number for video assistance, press a third predefined number for voice assistance and the Bot interacts with the customer. The bot may then ask the customer to end the call or connect the call to an agent and the agent handoff happens seamlessly.

Figure 3G:
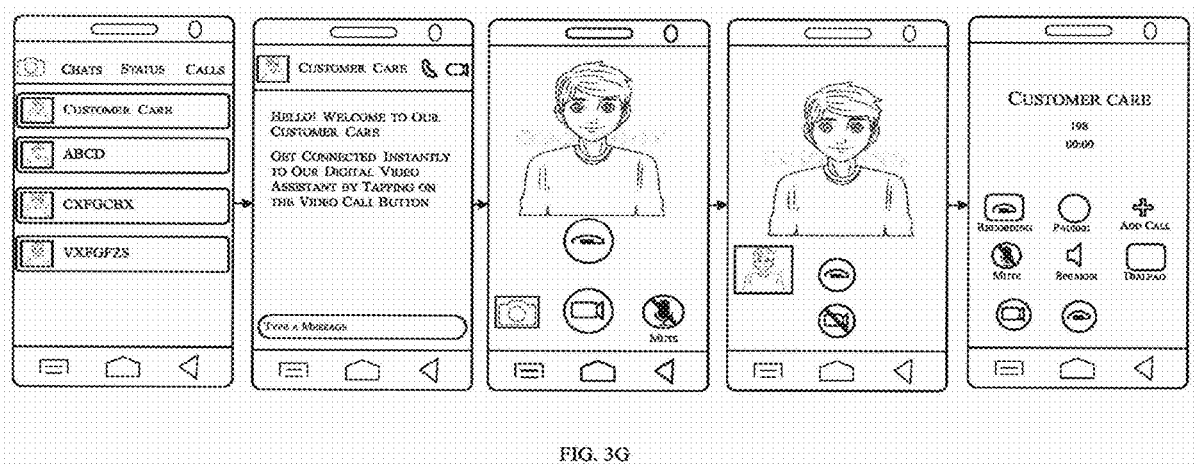

FIG. 3G illustrates a user Interface of the BOT-Maker Application by way of an example and not as a limitation and illustrates an exemplary representation of an inbound Voice IVR Call—Voice to Video BOT to Agent Handoff. FIG. 3G further illustrates an exemplary representation of an Outbound Voice or Video Call with Agent Handoff, an exemplary representation of an Inbound Video Call to Bot with Agent Handoff a VOIP Integration. FIG. 3G further illustrates exemplary representations of Auto Downgrade features from Video to Audio, Video to Text and Audio to Text respectively, Auto upgrade features from Text to Audio, Text to Video, and Audio to Video respectively in a single channel interface.

Figure 4:
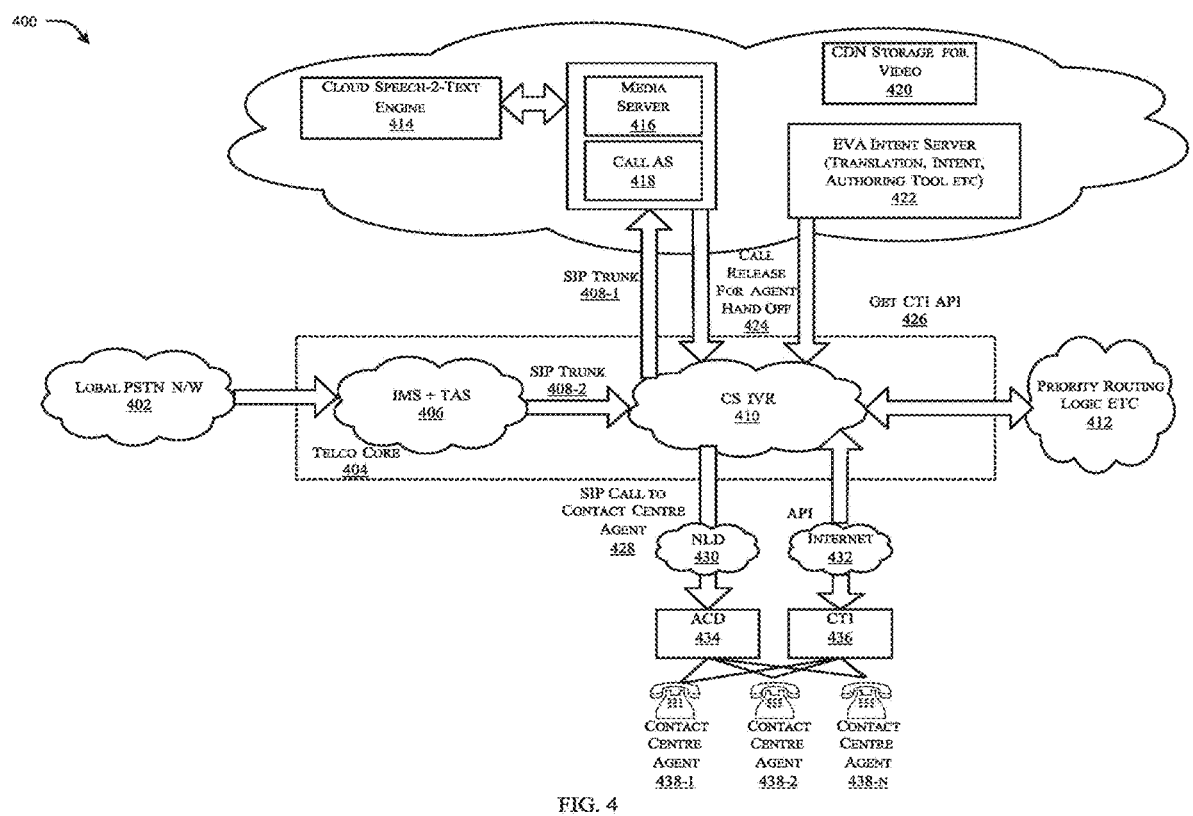
FIG. 4 illustrates an exemplary representation of an architecture of the Native Dialer flow, in accordance with embodiments of the present disclosure.

FIG. 4 illustrates an exemplary representation of an architecture of the Native Dialer flow (400), in accordance with embodiments of the present disclosure.

As illustrated, in an aspect a call may be placed via native dialer. An existing IVR (410) may terminate the call on intent service to handle automated conversation. A public switched telephone network (PSTN) (402) provides infrastructure and services for public telecommunication between second users (interchangeably referred to as contact centre agents (438-1, 438-2, 438-3). A telephony application server (TAS) along with IP Multimedia Subsystem (IMS) (406) residing in a Telco core (404) emulate the calling features provided by the PSTN (402) such as call forwarding, voicemail and conference bridges. The TAS may further provide unified messaging, video calling and the integration of softphone clients on multiple devices. An Intent Server (422) may hold conversation and answer user queries with the help of media server (4160, video/call AS (418) and a speech to text engine (414). The video responses are stored in a content delivery network (CDN) storage (420). If the user requires additional assistance, the call may be routed via a computer telephony integration (CTI) link (436) to agents (438) in queue, based on skills and availability. If the user wants to talk to the agent directly, then a session initiation protocol (SIP) trunk may be routed via an automatic call distributer (ACD) link (434). Priority Routing Logic (412) may be applied when a number of calls and requests are made.

FIG. 5A-5K illustrate representations for exemplary call flow scenarios and its implementation, in accordance with an embodiment of the present disclosure. As illustrated, the use cases may be marked as A, B, C, D, E and F.

Figure 5A:
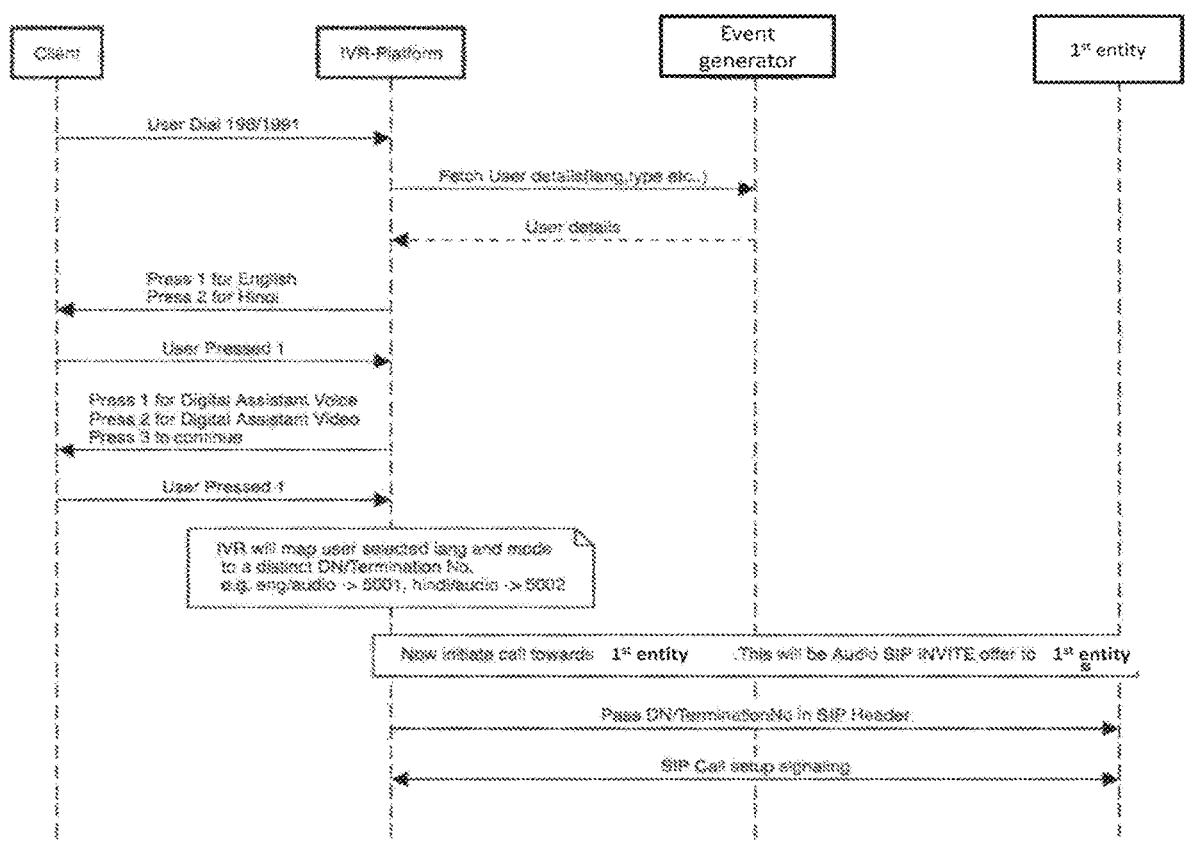

FIG. 5A illustrates a use case A depicting an inbound voice call to voice bot. The first user/client customer dials a predefined number for example a 198/1991 to an interactive voice response (IVR) platform. The IVR platform fetches user details, language, type and the like from an event generator such as Tibco but not limited to it. Tibco provides the user details and the IVR asks the user to press predefined numbers for a particular language, for example Press 1 for English and Press 2 for English and the like. If the user presses a first predefined number, the user is again requested to press certain predefined numbers for video, or audio. For example, the user is asked to Press 1 for Digital Assistant Voice, Press 2 for Digital Assistant Video and Press 3 for continue. If the user presses 1, the IVR will map user selected language and mode to a distinct DN/Termination No. e.g., English/audio→5001, Hindi/audio→5002. The call may be then initiated towards a radio access network such as the channel associated signalling (CAS0 platform. This will be audio SIP INVITE offer to the radio access network. The IVR platform may pass dialling number (DN) or a Termination number in an SIP header and the radio access network will perform a SIP call set up signalling.

Figure 5B:
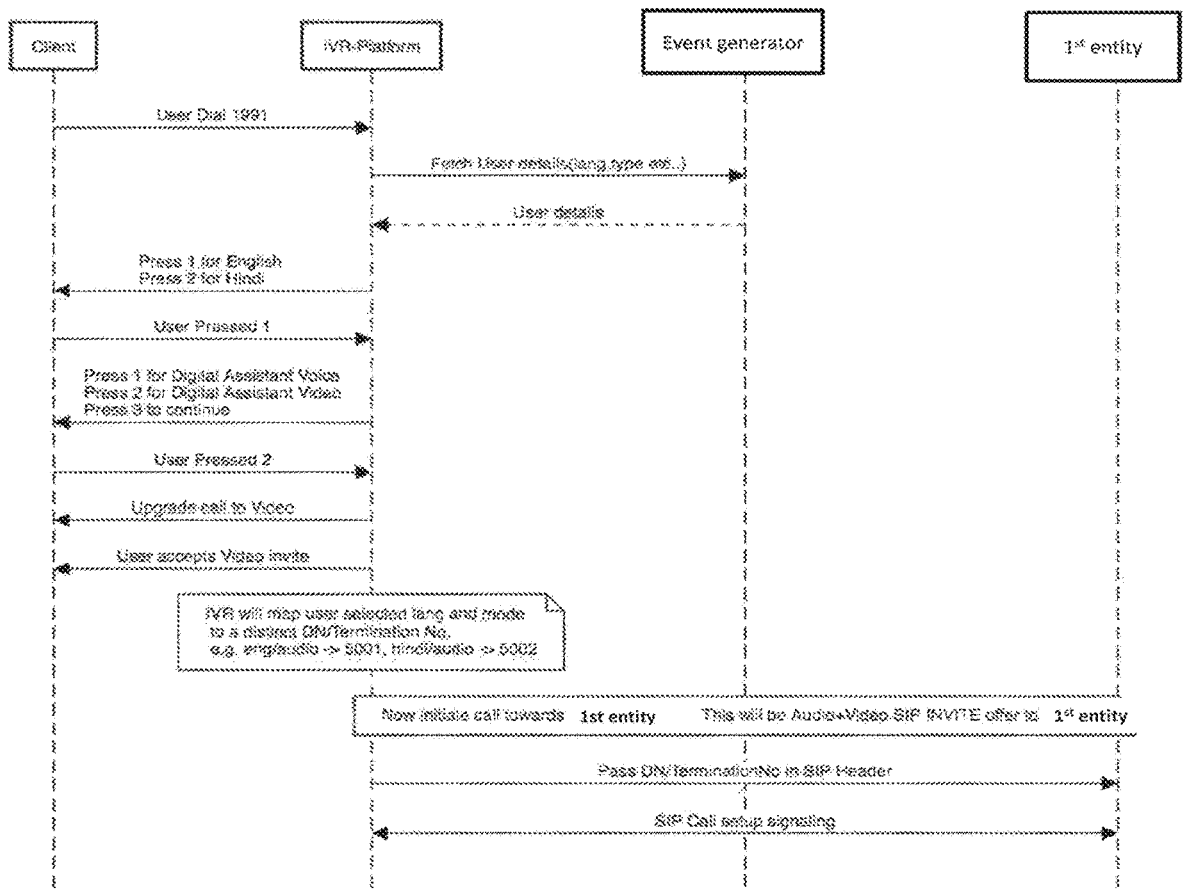

FIG. 5B illustrates a use case B providing 1991 inbound voice call to video bot. The first user/client/customer dials a predefined number for example a 1991 to an IVR platform. The IVR platform fetches user details, language, type and the like from an event generator such as Tibco but not limited to it. Event generator provides the user details and the IVR asks the user to press predefined numbers for a particular language, for example Press 1 for English and Press 2 for English and the like. If the user presses a first predefined number, the user is again requested to press certain predefined numbers for video, or audio. For example, the user is asked to Press 1 for Digital Assistant Voice, Press 2 for Digital Assistant Video and Press 3 for continue. If the user presses 2, the IVR platform upgrades call to video and the user accepts the video call. The IVR will map user selected language and mode to a distinct DN/Termination No. e.g., English/audio→5001, Hindi/audio→5002. The call may be then initiated towards a radio access network such as the CAS platform. This will be a combination of audio and video SIP INVITE offer to CAS. The IVR platform may pass DN/Termination number in SIP header and the CAS will SIP call set up signalling.

Figure 5C:
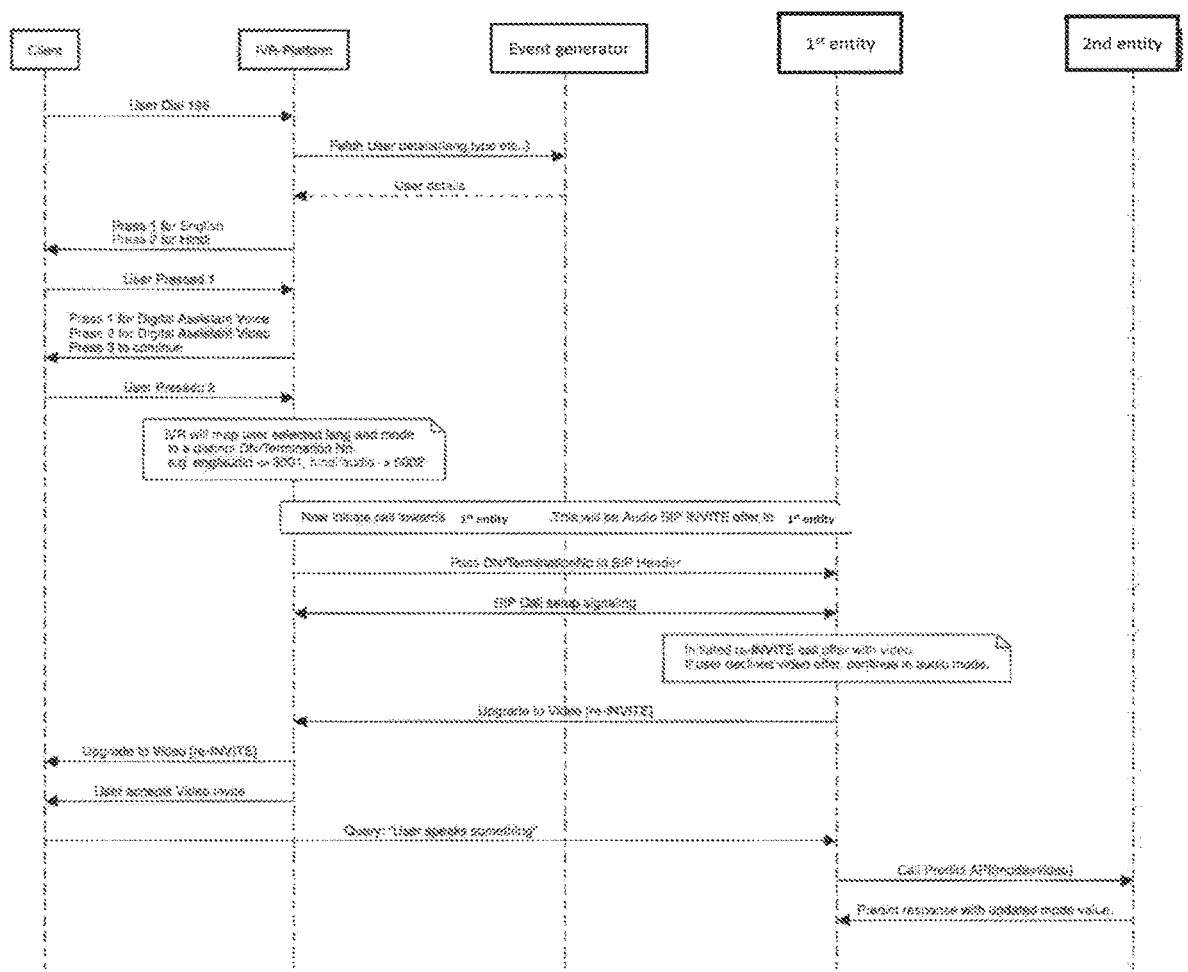

FIG. 5C illustrates a use case B providing 198 inbound voice call to video bot. The first user/client/customer dials a predefined number for example a 198 to an IVR platform. The IVR platform fetches user details, language, type and the like from an event generator such as Tibco but not limited to it. The event generator provides the user details and the IVR asks the user to press predefined numbers for a particular language, for example Press 1 for English and Press 2 for English and the like. If the user presses a first predefined number, the user is again requested to press certain predefined numbers for video, or audio. For example, the user is asked to Press 1 for Digital Assistant Voice, Press 2 for Digital Assistant Video and Press 3 for continue. If the user presses 2, the IVR will map user selected language and mode to a distinct DN/Termination No. e.g., English/audio→5001, Hindi/audio→5002. The call may be then initiated towards a radio access network such as the radio access network platform. This will be an audio SIP INVITE offer to CAS. The IVR platform may pass DN/Termination number in SIP header and the CAS will SIP call set up signalling. The radio access network may further re-invite call offer with video. If the first user declines the video mode continue with audio mode. Or else if the video reinvites sent by the radio access network to the IVR platform is accepted by the first user, the first user sends a query, the proposed system predicts an application programming interface (API) in video mode and sends the predicted response with uploaded mode value.

Figure 5D:
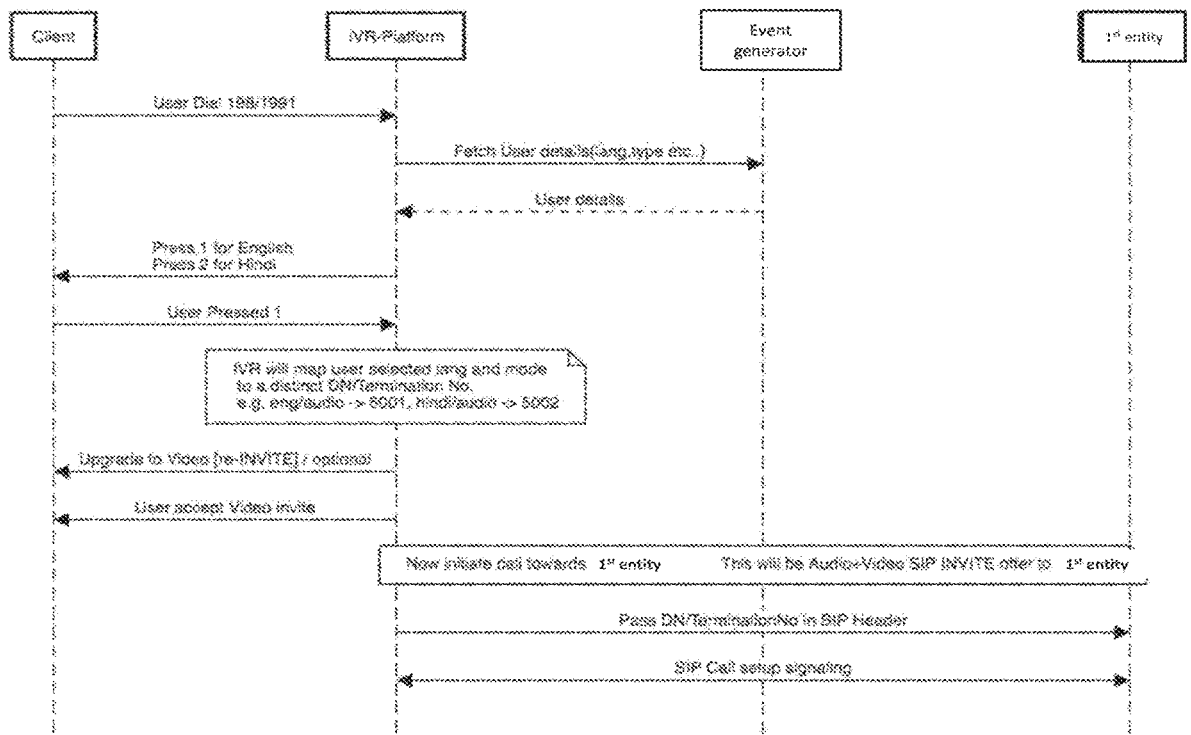

FIG. 5D illustrates a use case C providing 198/1991 Inbound Video Call to Video Bot. The first user/client/customer dials a predefined number for example a 198/1991 to an IVR platform. The IVR platform fetches user details, language, type and the like from an event generator such as Tibco but not limited to it. The event generator provides the user details and the IVR asks the user to press predefined numbers for a particular language, for example Press 1 for English and Press 2 for English and the like. If the user presses a first predefined number, the user is again requested to press certain predefined numbers for video, or audio. For example, the user is asked to Press 1 for Digital Assistant Voice, Press 2 for Digital Assistant Video and Press 3 for continue. If the user presses 2, the IVR platform upgrades call to video (re-invite optional) and the user accepts the video invite. The IVR will map user selected language and mode to a distinct DN/Termination No. e.g., English/audio→5001, Hindi/audio→5002. The call may be then initiated towards a radio access network. This will be a combination of audio and video SIP INVITE offer to the radio access network. The IVR platform may pass DN/Termination number in the SIP header and the radio access network will provide a SIP call set up signalling.

Figure 5E:
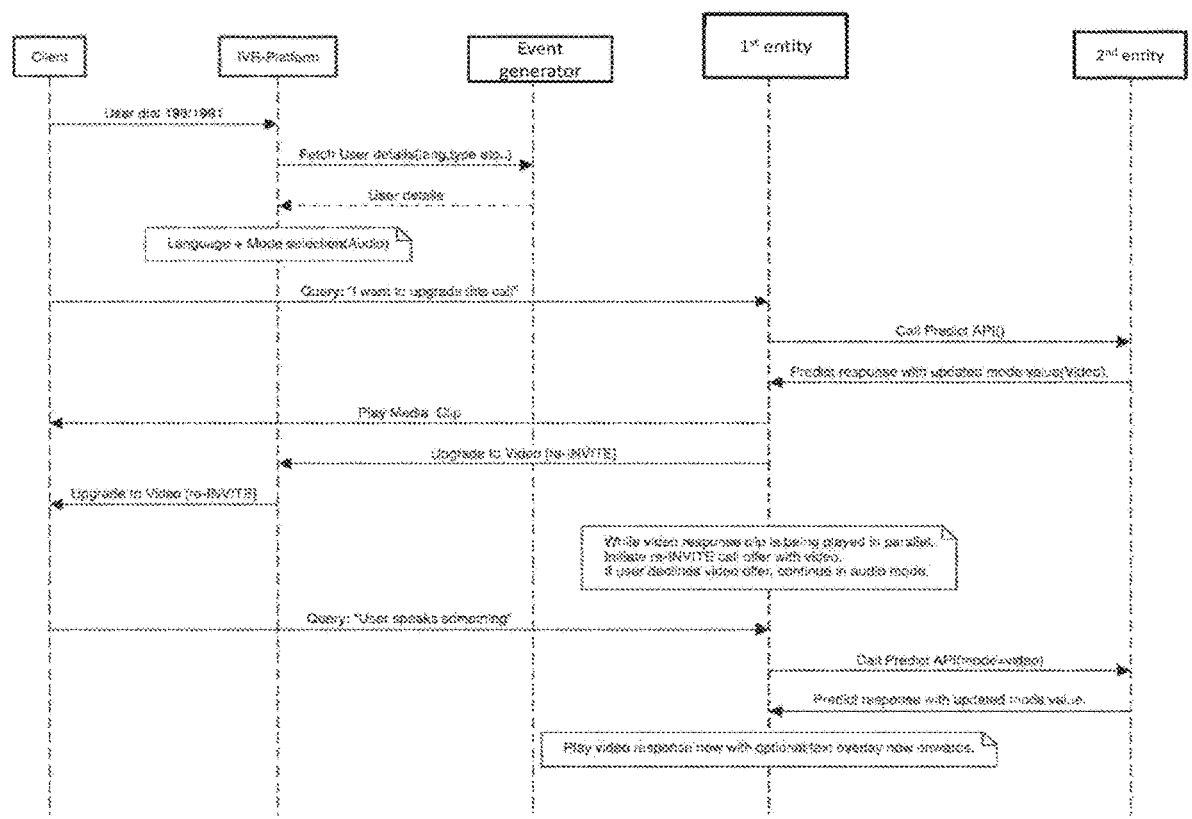

FIG. 5E illustrates a use case A→B providing 198/1991 Voice Bot Upgrade to Video Bot. The first user/client/customer dials a predefined number for example a 198/1991 to an IVR platform. The IVR platform fetches user details, language, type and the like from an event generator. The Event generator provides the user details and language and mode selection occurs in audio mode. The user sends a query "I want to upgrade this call" to the radio access network. A call predict API may be sent by radio access network to the proposed system, play media clip to the first user. The radio access network then send upgrade to video (re-INVITE) to IVR which in turn sends it to the first user. While video response clip is played in parallel, initiate re-INVITE video call to the first user. If the first user declines the video offer, continue in audio mode. The user sends a query by speaking to the radio access network. A call predict API may be sent by the radio access network to the proposed system, predict response with updated mode value and a media clip is played.

Figure 5F:
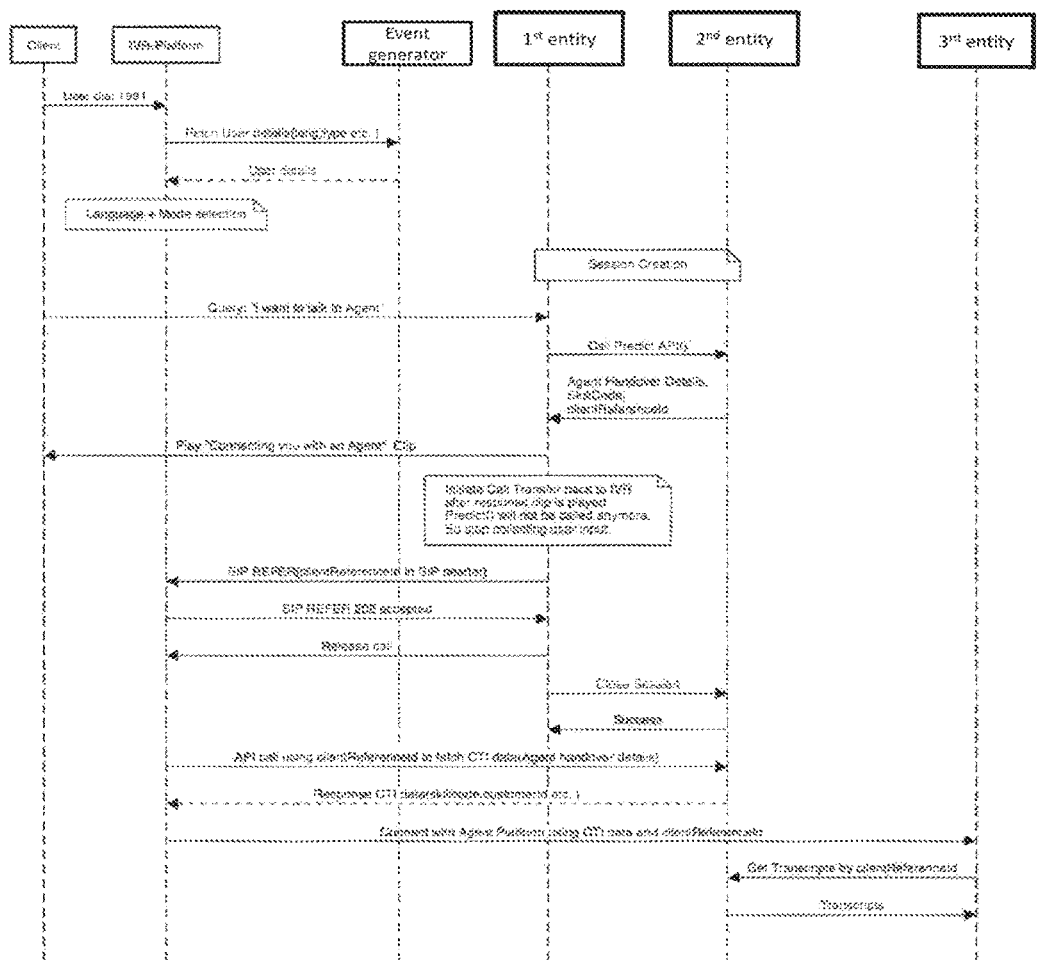

FIG. 5F illustrates a use case A→D, B→D, C→D providing IVR:198 Bot to Agent Hand-Off. The first user/client/customer dials a predefined number for example a 198/1991 to an IVR platform. The IVR platform fetches user details, language, type and the like from an event generator. The Event generator provides the user details and language and mode selection in audio mode. A session may be then created. A query may be sent as "I want to talk to an agent". A call predict API, agent handover details, skill code and client reference id may be sent by the radio access network to the proposed system. The system may play "connecting to an agent clip". The system may then initiate call transfer back to the IVR platform. A predict ( ) will not be called anymore. SIP REFER/SIP BYE to the IVR platform may then be sent such as SIP REFER 202 to release call or close the session. The session may then be deemed successful. The API call may use a client reference id to fetch CTI data such as Agent handoff details. The radio access network may then send response CTI data, connects with Agent platform to an entity and receive transcripts by client reference ID and then send transcripts to the radio access network.

Figure 5G:
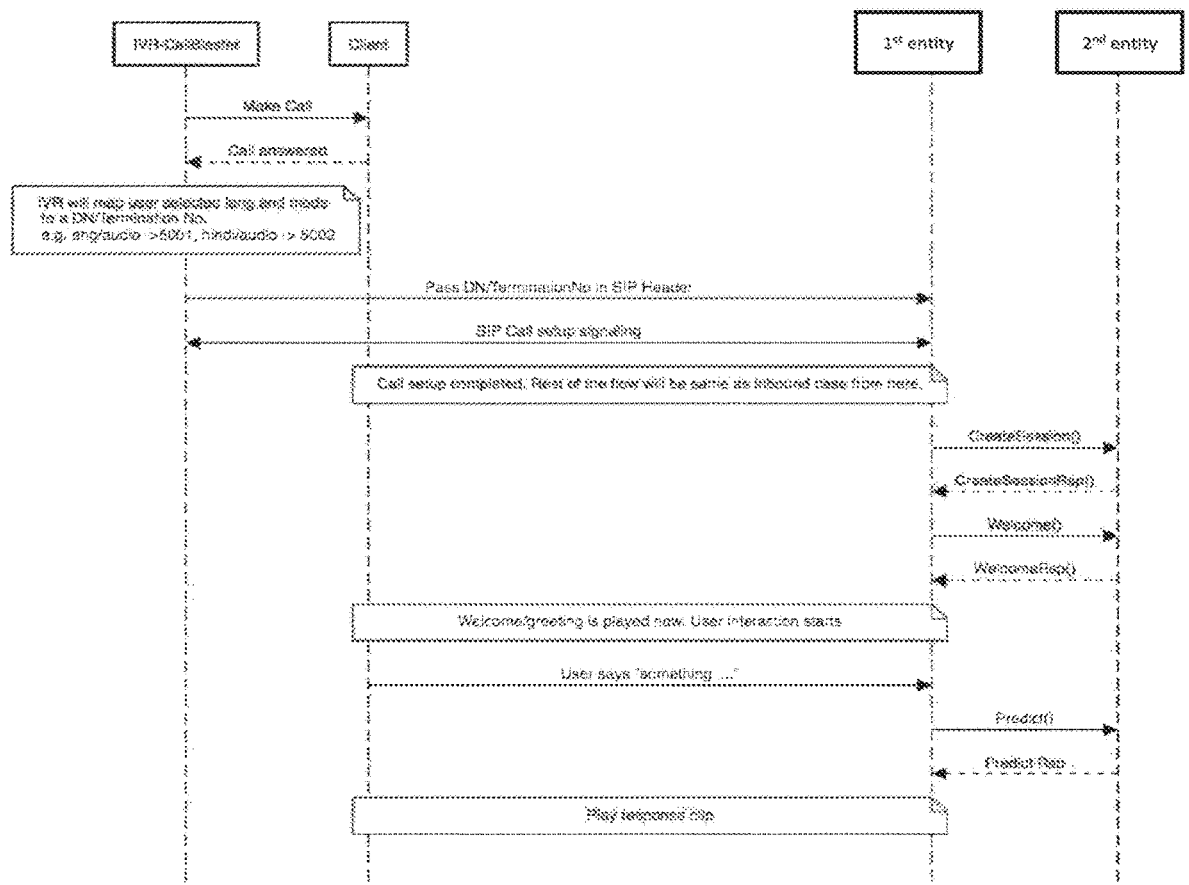

FIG. 5G illustrates a use case A→D, B→D, C→D providing IVR:IVR:1991 Bot to Agent Hand-Off. The first user/client/customer dials a predefined number for example a 198/1991 to an IVR platform. The IVR platform fetches user details, language, type and the like from an event generator. The event generator provides the user details and language and mode selection occurs in audio mode. A session created. A query is sent "I want to talk to an agent". A call predict API, agent handover details, skill code and client reference id may be sent by radio access network to the proposed system. A "connecting to an agent clip" may be played and then call transfer back to the IVR may be initiated. A Predict ( ) will not be called anymore. SIP REFER/SIP BYE to the IVR platform may then be sent such as SIP REFER 202 to release call or close the session. The session may then be deemed successful. The API call may use a client reference id to fetch CTI data such as Agent handoff details. The radio access network may then send response CTI data, connects with Agent platform to an entity and receive transcripts by client reference ID and then send transcripts to the radio access network.

Figure 5H:
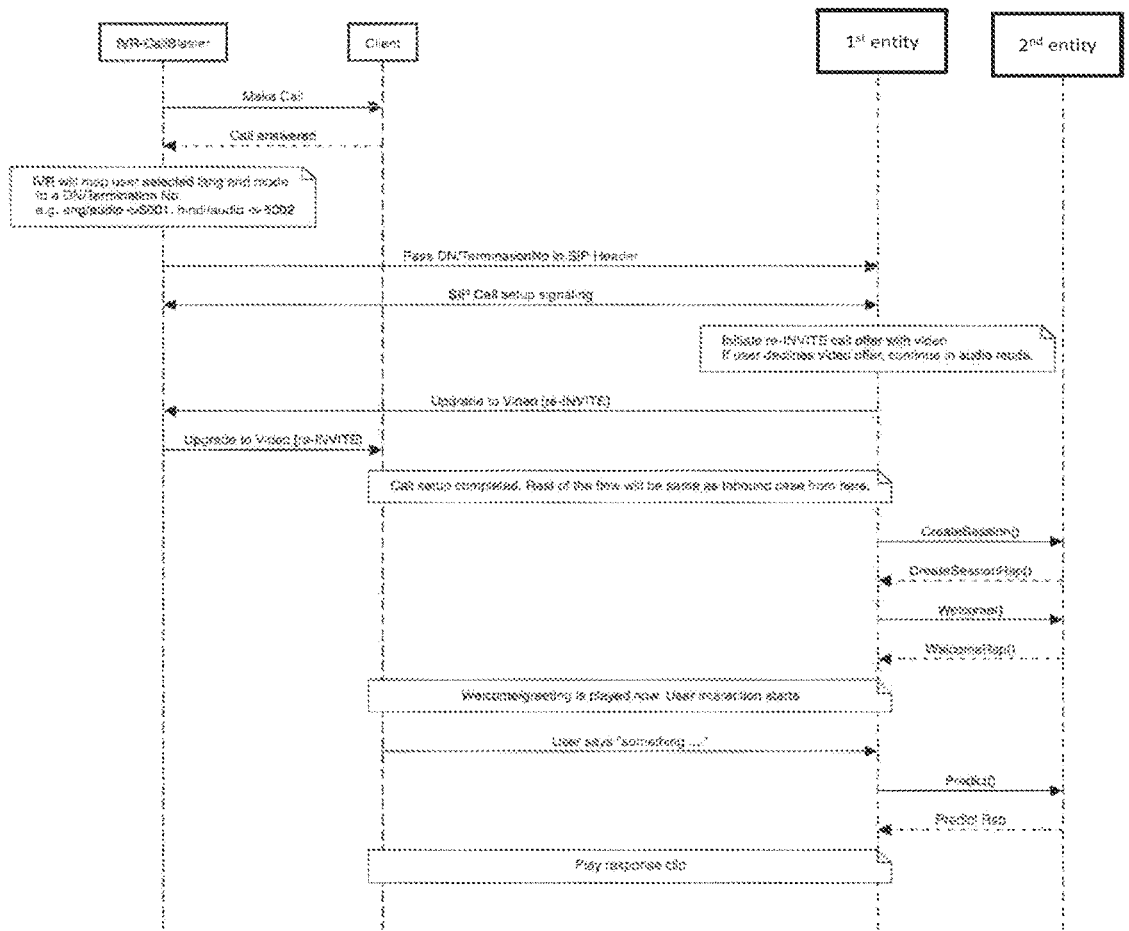
Figure 51:
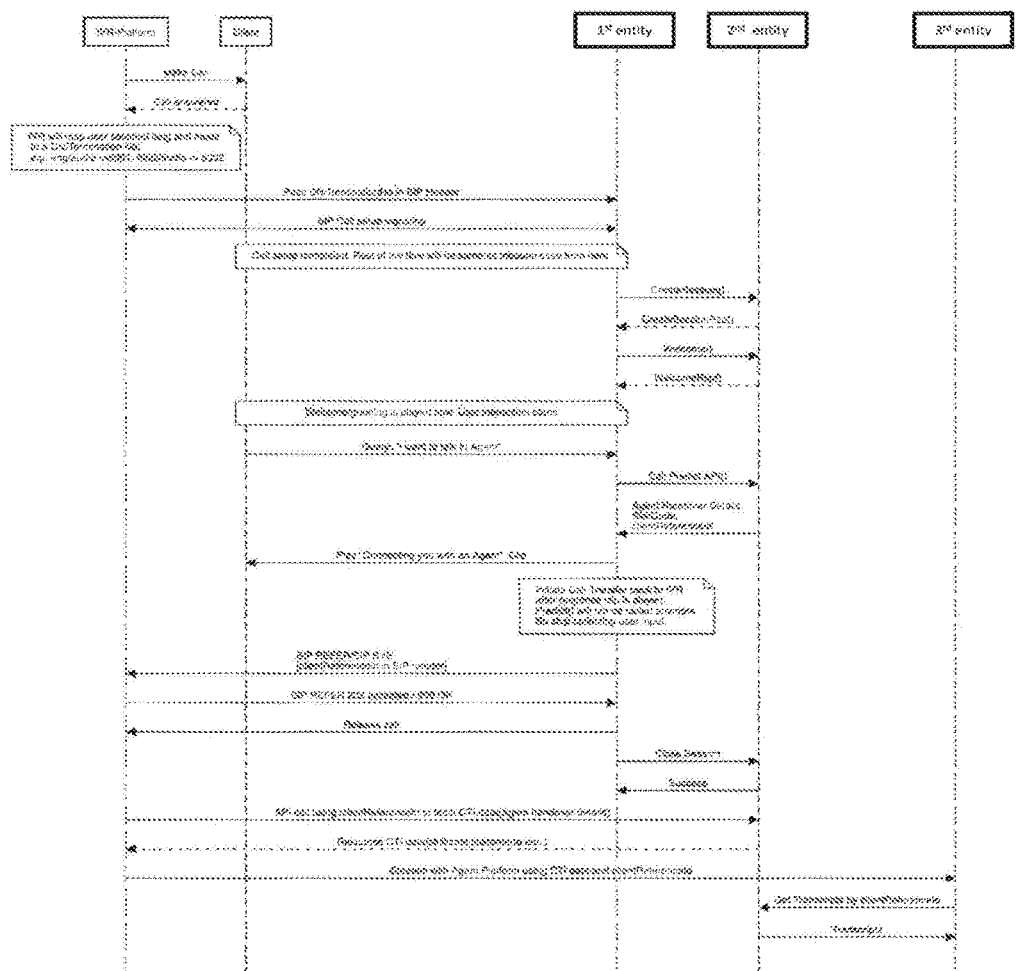

FIG. 5H illustrates a use case E providing IVR:Outbound Blaster:Voice Bot. The IVR call blaster makes a call to an IVR platform. The client answers the call. The IVR will map user selected language and mode to a distinct DN/Termination No. e.g., English/audio→5001, Hindi/audio→5002. The call may be then initiated towards a radio access network such as the CAS platform. This will be a combination of audio and video SIP INVITE offer to CAS. The IVR platform may pass DN/Termination number in SIP header and the CAS will SIP call set up signalling. Call set up is completed here. Rest of the flow will be same as the inbound case. The communication between the radio access network and the proposed system includes createsession( ), Create SessionRsp( ), Welcome( ), and WelcomeRsp( ). Welcome greeting is played then and user interaction starts. User says something after which predict( ) and predictRsp( ) functions are relayed to play response clip.

FIG. 5I illustrates a use case F providing IVR:outbound Blaster:Voice Call Upgraded to Video Bot. The IVR call blaster makes a call to an IVR platform. The client answers the call. The IVR will map user selected language and mode to a distinct DN/Termination No. e.g., English/audio→5001, Hindi/audio→5002. The call may be then initiated towards a radio access network such as the radio access network platform. This will be a combination of audio and video SIP INVITE offer to CAS. The IVR platform may pass DN/Termination number in SIP header and the CAS will SIP call set up signalling. Initiate re-invite call offer with Video. If user declines video, continue in audio mode. Upgrade to video Re-Invite sent to IVR blaster platform which is ten sent to the first user/client. Call set up is completed here. Rest of the flow will be same as the inbound case. The communication between the radio access network and the proposed system includes createsession( ), Create SessionRsp( ), Welcome( ), and WelcomeRsp( ). Welcome greeting is played then and user interaction starts. User says something after which predict( ) and predictRsp( ) functions are relayed to play response clip.

Figure 5J:
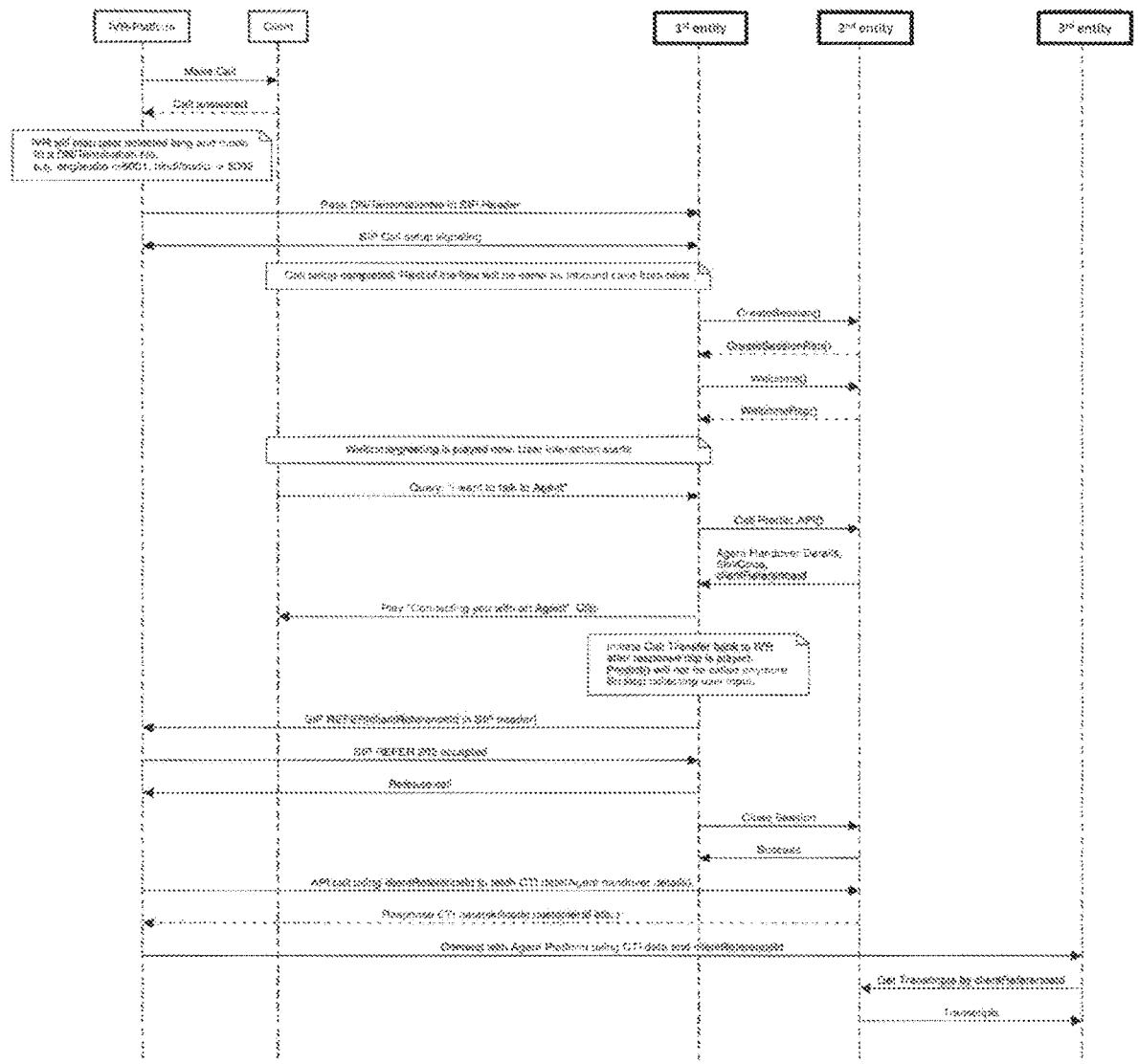

FIG. 5J illustrates a use case E→D, F→D providing IVR:outbound Blaster:Bot to Agent Handoff. The IVR call blaster makes a call to an IVR platform. The client answers the call. The IVR will map user selected language and mode to a distinct DN/Termination No. e.g., English/audio→5001, Hindi/audio→5002. The call may be then initiated towards a radio access network such as the radio access network. This will be a combination of audio and video SIP INVITE offer to the radio access network. The IVR platform may pass DN/Termination number in SIP header and the radio access network will provide a SIP call set up signalling. Initiate re-invite call offer with Video. If the user declines video, continue in audio mode. Upgrade to video Re-Invite sent to IVR blaster platform which is ten sent to the first user/client. Call set up is completed here. Rest of the flow will be same as the inbound case. The communication between CAS and the proposed system includes createsession( ), Create SessionRsp( ), Welcome( ), and WelcomeRsp( ). Welcome greeting is played, a user interaction starts. A session is created. A query is sent "I want to talk to an agent". A call predict API, agent handover details, skill code and client reference id may be sent by the radio access network to the proposed system. A "connecting to an agent clip" may be played and then call transfer back to the IVR may be initiated. A Predict( ) will not be called anymore. SIP REFER/SIP BYE to the IVR platform may then be sent such as SIP REFER 202 to release call or close the session. The session may then be deemed successful. The API call may use a client reference id to fetch CTI data such as Agent handoff details. The radio access network may then send response CTI data, connects with Agent platform to an entity and receive transcripts by client reference ID and then send transcripts to the radio access network.

Figure 5K:
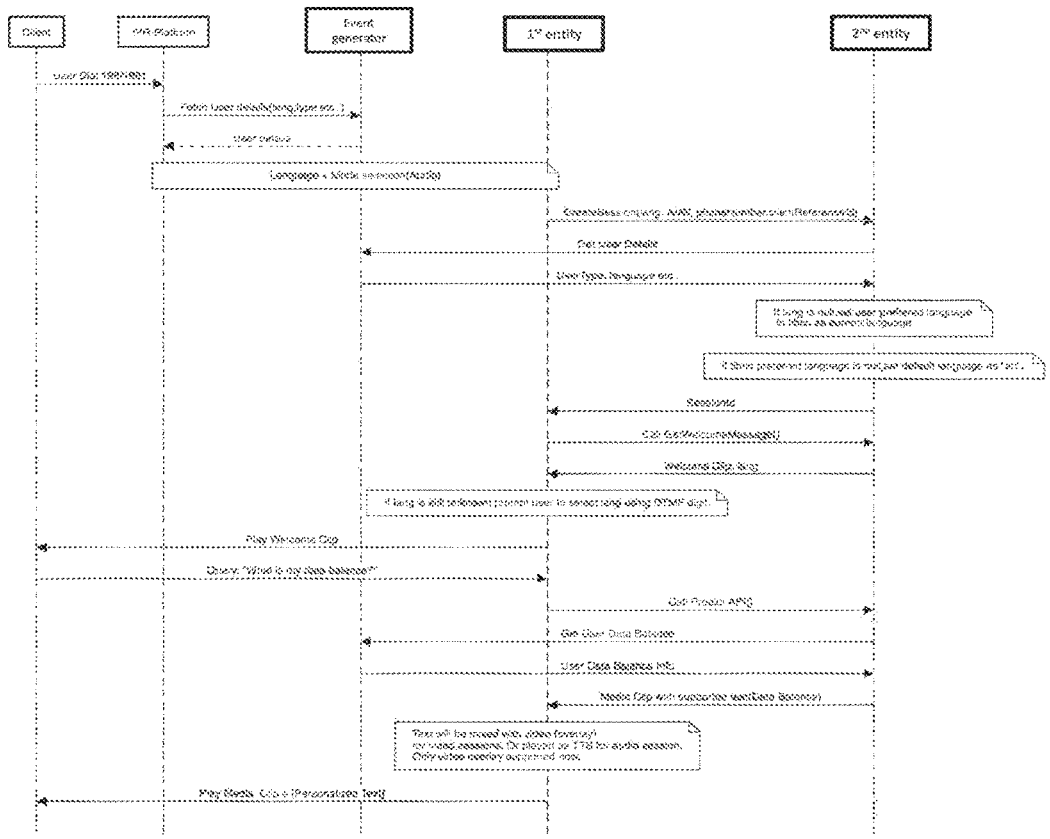

FIG. 5K illustrates IVR:Personalized query through Event generator API Integration. The first user/client/customer dials a predefined number for example a 198/1991 to an IVR platform. The IVR platform fetches user details, language, type and the like from an event generator. The event generator provides the user details and language and mode selection occurs in audio mode. The radio access network creates session having language, phone number, client reference id and gets user details and communicates to the event generator. The event generator provides language types etc. If the language type is null, then the first user preferred language in Event generator is used as current language. If the event generator preferred language is null, then set a default language as "en". Session id is sent by the proposed system of the entity and the event generator sends a call get welcome message ( ) and in response to it, a welcome clip language is sent to the event generator. If the language is still unknown, the first user is asked to select language using dual tone multi-frequency (DTMF) digit. A welcome clip is then played by the event generator to the first user. For example, if the first user query is 'What is my balance?', a call predict API by the radio access network may be sent to the proposed system. A user data balance from the event generator may be collected, where the event generator provides data balance to the proposed system. The proposed system provides a media clip with supported text (data balance). The text will be mixed with video (overlay) for video sessions or played as TTS for audio session. However only video session is supported here. The media clip may be played by the radio access network to the user.

The Table below highlights the various use cases when the first user makes a voice call, makes a video call or receives a voice call.

| User | Voice Bot | Video Bot | Agent |
| --- | --- | --- | --- |
| Makes Voice Call | A | B | D |
| Makes Video Call | — | C | D |
| Receives Voice Call | E | F | D |

Figure 6:
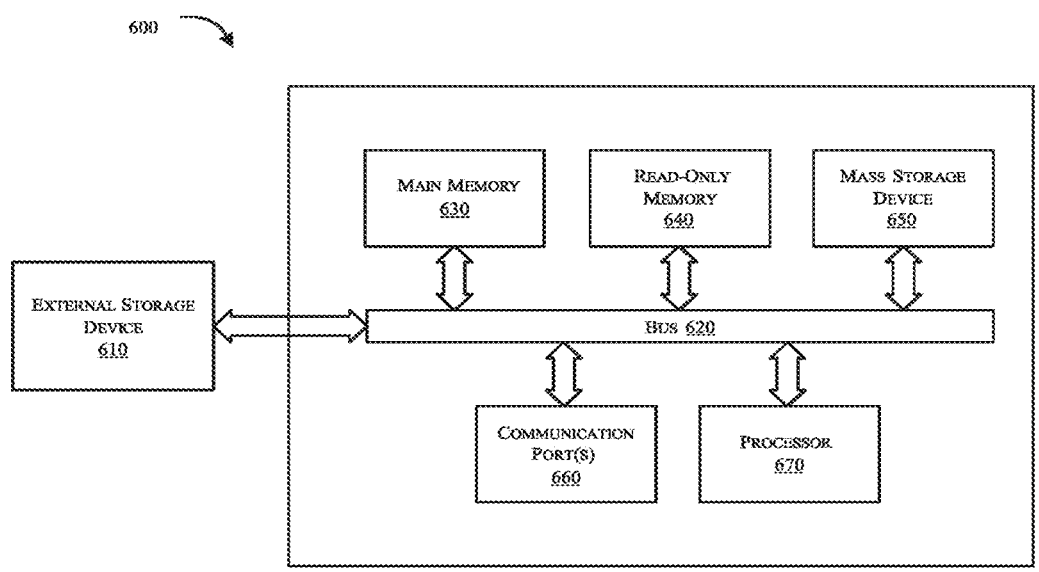
FIG. 6 refers to the exemplary computer system in which or with which embodiments of the present invention can be utilized, in accordance with embodiments of the present disclosure.

FIG. 6 illustrates an exemplary computer system in which or with which embodiments of the present invention can be utilized in accordance with embodiments of the present disclosure. As shown in FIG. 6, computer system 600 can include an external storage device 610, a bus 620, a main memory 630, a read only memory 640, a mass storage device 650, communication port 660, and a processor 670. A person skilled in the art will appreciate that the computer system may include more than one processor and communication ports. Examples of processor 670 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 670 may include various modules associated with embodiments of the present invention. Communication port 660 can be any of an RS-232 port for use with a modem-based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects. Memory 630 can be Random Access Memory (RAM), or any other dynamic storage device commonly known in the art. Read-only memory 640 can be any static storage device(s) e.g., but not limited to, a Programmable Read Only Memory (PROM) chips for storing static information e.g., start-up or BIOS instructions for processor 670. Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 620 communicatively couples with the processor(s) 670 with the other memory, storage and communication blocks. Bus 620 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 670 to software system.

Optionally, operator and administrative interfaces, e.g., a display, keyboard, and a cursor control device, may also be coupled to bus 620 to support direct operator interaction with a computer system. Other operator and administrative interfaces can be provided through network connections connected through communication port 660. The external storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, the present disclosure provides a unique and inventive solution for facilitating generation of one or more automated visual responses to a user query based on a machine learning based architecture, thus providing an automated and improved user experience solution. The solution offered by the present disclosure ensures that the response generation is accurate/precise due to the involvement of well-trained ML engine. Further, other benefits include bringing various the best of a multifaced feature to the end customer as well as the entity. Customers can easily toggle between any mode which he is comfortable to interact with. For example, if the customer is in a crowded environment, he may not be comfortable to ask for sensitive personalized information, he can then switch to the Text Bot mode and get the required information through Text displayed on the screen. Whereas the Video mode is useful for customers to view product highlights, demo videos and the like which require the customer to have a visual medium of displaying the required information. Furthermore, there will be reduced traffic to human agents leading to cost Savings. Multilingual capability will be provided therefore allowing further cost savings in call centers. There will also be reduced in-Call wait time and abandonment. Standardized response to queries will be provided and there will be Open API's for real-time CRM dip to bring personalized information on screen post biometric authentication.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

ADVANTAGES OF THE PRESENT DISCLOSURE

The present disclosure enable a 3-in-one Chat, Audio and Video service integration to provide seamless customer experience.

The present disclosure creates a truly Omni-Channel single view customer care service by Unifying Text Bots, Voice Bots and Video Bots into one single 3 in 1 Bot instance via OTT and Telephony channel.

The present disclosure facilitates flexibility to the user to seamlessly toggle between either of the 3 modes as per his convenience and comfort.

The present disclosure facilitates transferring to human agent for complex support.

The present disclosure facilitates third Party BOT Integration.

The present disclosure facilitates multilingual capabilities.

We claim:

1. A system for switching between a plurality of modes in a multi-bot interface, said system comprising a processor that executes a set of executable instructions that are stored in a memory, upon execution of which, the processor causes the system to:
    receive, by a bot maker engine, a first set of data packets corresponding to a user query of a user, wherein the bot maker engine is associated with the processor;
    receive, by the bot maker engine, from a database coupled to a centralized server, a knowledgebase comprising a set of expressions associated with one or more potential intents corresponding to the user query, wherein the centralized server is operatively coupled to the processor;
    extract, by the bot maker engine, a set of attributes corresponding to a form of the user query, wherein the form of the user query is selected from any or a combination of a textual form, an audio form, and a video form;
    generate, by a Machine learning (ML) engine, one or more responses based on the extracted set of attributes, wherein the ML engine is associated with the processor; and
    switch, by the ML engine, the user query between the plurality of modes based on a requirement of the user and a requirement of the system in the multi-bot interface, the plurality of modes corresponding to any or a combination of the textual form, the audio form, and the video form in the multi-bot interface, wherein the multi-bot interface is represented in the form of a combination of an animated character, a personality character, or an actual representation of an entity character.

2. The system as claimed in claim 1, wherein the processor is further configured to convert, by the ML engine, the one or more responses to any or a combination of a textual form, an audio form, and a video form based on the user and the system requirement in the multi-bot interface.

3. The system as claimed in claim 1, wherein the multi-bot interface is a multi-channel interface.

4. The system as claimed in claim 1, wherein the database coupled to the centralised server is configured to store a plurality of users, a plurality of bots, a plurality of user queries, a plurality of video forms, a plurality of audio forms and a plurality of textual messages associated with a pre-defined topic with a time stamp.

5. The system as claimed in claim 1, wherein the processor is further configured to extract, by the bot maker engine, a second set of data packets from the centralized server to initialize the multi-bot interface, the second set of data packets pertaining to information that comprises the one or more potential intents, one or more video forms, and a set of trending queries.

6. The system as claimed in claim 1, wherein a user is identified, verified, and then authorized before execution of the system for switching between the plurality of modes in the multi-bot interface.

7. The system as claimed in claim 1, wherein processor is further configured to initiate, the one or more responses once an authorized user generates a user query, wherein the one or more responses corresponding to the user query is mapped with the one or more potential intents.

8. The system as claimed in claim 1, wherein the processor is further configured to enable the user, by the ML engine to switch the user query to any of the textual, the audio form and the video form from a current form to initiate the user query in the multi-bot interface.

9. The system as claimed in claim 1, wherein the processor is further configured to enable the user, by the ML engine to switch the response to the user query to any of the textual, the audio form and the video form from a current form of the response provided by the system in the multi-bot interface.

10. The system as claimed in claim 1, wherein the one or more responses pertaining to the audio form and the video form are manually recorded using a recording device.

11. The system as claimed in claim 1, wherein processor is further configured to pre-process by the ML engine, the knowledgebase through a prediction engine for any or a combination of data cleansing, data correction, synonym formation, proper noun extraction, white space removal, stemming of words, punctuation removal, feature extraction, and special character removal.

12. The system as claimed in claim 1, wherein the processor is further configured to generate the one or more responses and record respective potential video frame, audio or textual responses for a set of user queries.

13. A method for switching between a plurality of modes in a multi-bot interface, said method comprising:
    receiving, by a bot maker engine, a first set of data packets corresponding to a user query of a user, wherein the bot maker engine is associated with a processor, wherein the processor executes a set of executable instructions that are stored in a memory;

receiving, by the bot maker engine, from a database coupled to a centralized server, a knowledgebase comprising a set of expressions associated with one or more potential intents corresponding to the user query, wherein the centralized server is operatively coupled to the processor;

extracting, by the bot maker engine, a set of attributes corresponding to a form of the user query, wherein the form of the user query is selected from any or a combination of a textual form, an audio form, and a video form;

generating, by a Machine learning (ML) engine, one or more responses based on the extracted set of attributes, wherein the ML engine is associated with the processor; and switching, by the ML engine, the user query between the plurality of modes based on a requirement of the user and a requirement of a method in the multi-bot interface, the plurality of modes corresponding to any or a combination of the textual form, the audio form, and the video form in the multi-bot interface, wherein the multi-bot interface is represented in the form of a combination of an animated character, a personality character, or an actual representation of an entity character.

14. The method as claimed in claim 13, wherein the method further comprises the steps of:
converting, by the ML engine, the one or more responses to any or a combination of a textual form, an audio form, and a video form based on the user and the method requirement in the multi-bot interface.

15. The method as claimed in claim 13, wherein the multi-bot interface is a multi-channel interface.

16. The method as claimed in claim 13, wherein the database coupled to the centralised server is configured to store a plurality of users, a plurality of bots, a plurality of user queries, a plurality of video forms, a plurality of audio forms and a plurality of textual messages associated with a predefined topic with a time stamp.

17. The method as claimed in claim 13, wherein the method further comprises the steps of:
extracting, by the bot maker engine, a second set of data packets from the centralized server to initialize the multi-bot interface, the second set of data packets pertaining to information that comprises the one or more potential intents, one or more video forms, and a set of trending queries.

18. The method as claimed in claim 13, wherein a user is identified, verified, and then authorized before execution of the method for switching between the plurality of modes in the multi-bot interface.

19. The method as claimed in claim 13, wherein the method further comprises the step of:
initiating, by the processor, the one or more responses are initiated once an authorized user generates a user query, wherein the one or more responses corresponding to the user query is mapped with the one or more potential intents.

* * * * *